US006490563B2

(12) United States Patent
Hon et al.

(10) Patent No.: US 6,490,563 B2
(45) Date of Patent: Dec. 3, 2002

(54) PROOFREADING WITH TEXT TO SPEECH FEEDBACK

(75) Inventors: Hsiao-Wuen Hon, Woodinville, WA (US); Dong Li, Beijing (CN); Xuedong Huang, Woodinville, WA (US); Yun-Chen Ju, Bellevue, WA (US); Xianghui Sean Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/135,497

(22) Filed: Aug. 17, 1998

(65) Prior Publication Data

US 2001/0044724 A1 Nov. 22, 2001

(51) Int. Cl.⁷ .............................. G10L 13/08; G06K 9/62
(52) U.S. Cl. ........................ 704/260; 704/235; 382/187
(58) Field of Search ................. 704/260, 235; 382/187

(56) References Cited

U.S. PATENT DOCUMENTS

| | | | |
|---|---|---|---|
| 4,531,119 A | | 7/1985 | Nakayama et al. ......... 340/712 |
| 4,707,858 A | * | 11/1987 | Fette .......................... 704/251 |
| 4,717,911 A | | 1/1988 | Matsuura et al. ........... 340/724 |
| 4,777,600 A | | 10/1988 | Saito et al. ................. 364/419 |
| 4,783,807 A | * | 11/1988 | Marley ....................... 704/235 |
| 4,914,704 A | | 4/1990 | Cole et al. .................... 381/43 |
| 4,975,957 A | * | 12/1990 | Ichikawa et al. ............. 381/36 |
| 5,278,943 A | * | 1/1994 | Gasper et al. .............. 704/200 |
| 5,282,267 A | | 1/1994 | Woo, Jr. et al. ............ 395/157 |
| 5,384,893 A | * | 1/1995 | Hutchins ..................... 704/267 |
| 5,576,955 A | | 11/1996 | Newbold et al. ........... 395/795 |
| 5,649,060 A | * | 7/1997 | Ellozy et al. ............... 704/278 |
| 5,652,828 A | * | 7/1997 | Silverman ................... 704/260 |
| 5,729,629 A | | 3/1998 | Dai ............................. 382/187 |

FOREIGN PATENT DOCUMENTS

EP          0 200 389          11/1986

OTHER PUBLICATIONS

Protalk "Protalk for Windows" Biolink, 1993.*
"Word–Processing Station With Audio Text Synthesis", IBM Technical Disclosure Bulletin, vol. 26, No. 6, pp. 2866–2867, 11/1983.
Xuedong Huang et al., "*Microsoft Windows Highly Intelligent Speech Recognizer: Whisper*", IEEE International Conference on Acoustics, Speech and Signal Processing, 1995.
J. Goldsmith, "Dealing with Prosody in a Text–to–speech system", International Journal of Speech Technology vol. 3, Nov. 1999, pp. 51–63.

* cited by examiner

*Primary Examiner*—Tālivaldis Ivars Šmits
(74) *Attorney, Agent, or Firm*—Westman, Champlin & Kelly, P.A.; S. Koehler

(57) ABSTRACT

A computer implemented system and method of proofreading text in a computer system includes receiving text from a user into a text editing module. At least a portion of the text is converted to an audio signal upon the detection of an indicator, the indicator defining a boundary in the text by either being embodied therein or comprising delays in receiving text. The audio signal is played through a speaker to the user to provide feedback.

39 Claims, 9 Drawing Sheets

PROOFREADING WITH TEXT TO SPEECH FEEDBACK

BACKGROUND OF THE INVENTION

The present invention relates to data processing systems. More particularly, the present invention relates to proofreading text in a text editing system.

A text editing system or module, for example, a word processing application, is well known and allows easy manipulation of stored text. Many text editing modules also provide some level of proofreading. In many word processing applications, proofreading consists of a spelling checker for identifying spelling errors. In more advanced word processing applications, proofreading includes detecting grammatical and punctuation errors as well.

When performing spell checking, the word processing application scans the text stored in memory on the computer system and identifies spelling errors. To identify the errors, the word processing application compares each word of the text with a spelling dictionary. Spelling errors are detected when a word contained in the text does not exist in the spelling dictionary. After detection of each error, or after detection of all errors in the text, the individual errors are displayed to the user using a visual display device such as a cathode ray tube (CRT) or a liquid crystal display (LCD). The individual errors are visually identified to the user by highlighting or underlining the error in the surrounding text, and/or providing a suitable user interface that allows the user to see the error and select a suitable correction.

Although the word processing application is well suited for detecting textual errors such as spelling and grammar, current systems require the user to interact with the proofreading functions using the visual display device. This requires the user to remain in front of the visual display during the proofreading process.

Another text editing module in common use foremost Asian languages is a converter system that converts phonetic symbols to a selected language. Such a text editing module is often referred as IME (Input Method Editor) in "WINDOWS-95" or "WINDOWS NT" operating systems sold by Microsoft Corporation of Redmond, Wash. The phonetic symbols can be provided to a computer using a standard keyboard. The computer includes a converter module that converts the phonetic symbols to the selected language. For example, it is common to form Japanese text in a computer system by entering phonetic characters from an English or Latin keyboard. Inputting Japanese phonetic characters using the letters of the Latin alphabet is called "Romaji". The computer system compares each of the Romaji characters with a stored dictionary and produces a "Kana" sequence ("Kanas"). Kanas are Japanese syllabic symbols which represent the sound of Japanese. The IME converter then converts the Kana form into "Kanji" form, which is a formal Japanese writing language, through sophisticated linguistic analysis. (The formal Japanese writing system actually consists of a mixture of Kanjis and Kanas, where the Kanjis represent most of the content information and bear no direct information about pronunciation.)

However, in a conventional text processing system used in a Japanese word processor, the appropriate Kanji equivalent for the Kana sequence often must be selected using a so-called candidate display-and-choice method. Specifically, a number of Kanji candidates are displayed for a sequence of Kana so that the user can choose the appropriate one. This display-and-choice method is necessary since the Japanese language includes a number of homonyms and no explicit word boundaries, which cause inevitable Kana to Kanji conversion errors. By displaying the Kanji candidates, the user can view the possible candidates and select the appropriate Kanji representation. As can be appreciated by those skilled in the art, detection of the incorrect Kanji representation is cumbersome and time-consuming. Since the user must constantly switch attention from the text that is being inputted to the Kanji candidates displayed on the screen, user fatigue is a problem and high typewriting speed cannot be achieved.

Similarly, the text editing module used in a Chinese word processor also requires IME conversions which converts either from phonetic symbols (Pinyin) or stroke symbols (Wu-Bi) to the written Hanzi representations. Pinyin IME is the most popular phonetic Chinese IME and operates similar to the Japanese Kana IME discussed above. Users type phonetic spelling of Chinese Hanzi characters and the IME will convert the phonetic Pinyin string to the corresponding Hanzi string through the use of Pinyin dictionary and language models. Wu-Bi IME is the most popular stroke-based Chinese IME which converts the input stroke sequence into the correspondent Hanzi sequence according to a special Chinese stroke dictionary. In addition to the user fatigue problem mentioned above, it is in general very difficult to spot errors because neither explicit word boundaries nor semantic separators (like Kana) are present in Chinese. Particularly, the lack of tone marks in Pinyin IME causes far more homonyms to occur than with Japanese Kana IME. Often the list of homonyms for some pinyin sequences can be too long to fit on the entire screen of the visual display.

Accordingly, there is an ongoing need to more effectively and efficiently proofread text in many types of data processing systems employing text editing modules.

SUMMARY OF THE INVENTION

In general an embodiment of the present invention is to use audio feedback to help users detect errors (typing, spelling, grammar, speech recognition, or IME conversion) when executing a text editing system. This type of audio feedback will not only enable a user to perform eyes-free (therefore less intrusive) proofreading, but also allow the user to detect errors much more effectively when compared with other proofreading tools, particularly for Asian languages.

Another aspect of the present invention is a computer implemented system and method of proofreading text in a computer system that includes receiving text from a user into a text editing module. At least a portion of the text is converted to an audio signal. The audio signal is played through a speaker to the user to provide feedback, so the user can detect errors (e.g. typing, spelling, grammar, speech recognition and IME conversion) without looking at the screen.

Another aspect of the present invention is a dictation system operable on a computer for processing text. The computer includes a microphone and a speaker. The dictation system includes a speech recognition module receiving an input signal from the microphone and converting the input signal to text, and a text-to-speech module receiving the text and converting the selected text to an output signal providable to the speaker. Through the audio feedback, the users can detect recognition errors without looking at the screen.

Another aspect of the present invention is a proofreading system operable on a computer for inputting text via IME's. The computer includes an input device and a speaker. The proofreading system includes a text converter adapted to receive phonetic (or stroke) symbols from the input device and to convert the phonetic symbols to text. A text-to-speech module receives the text and converts the text to an output signal providable to the speaker, so users can easily detect conversion errors.

DETAILED DESCRIPTION OF THE PREFERRED EMBODIMENTS

Figure 1:
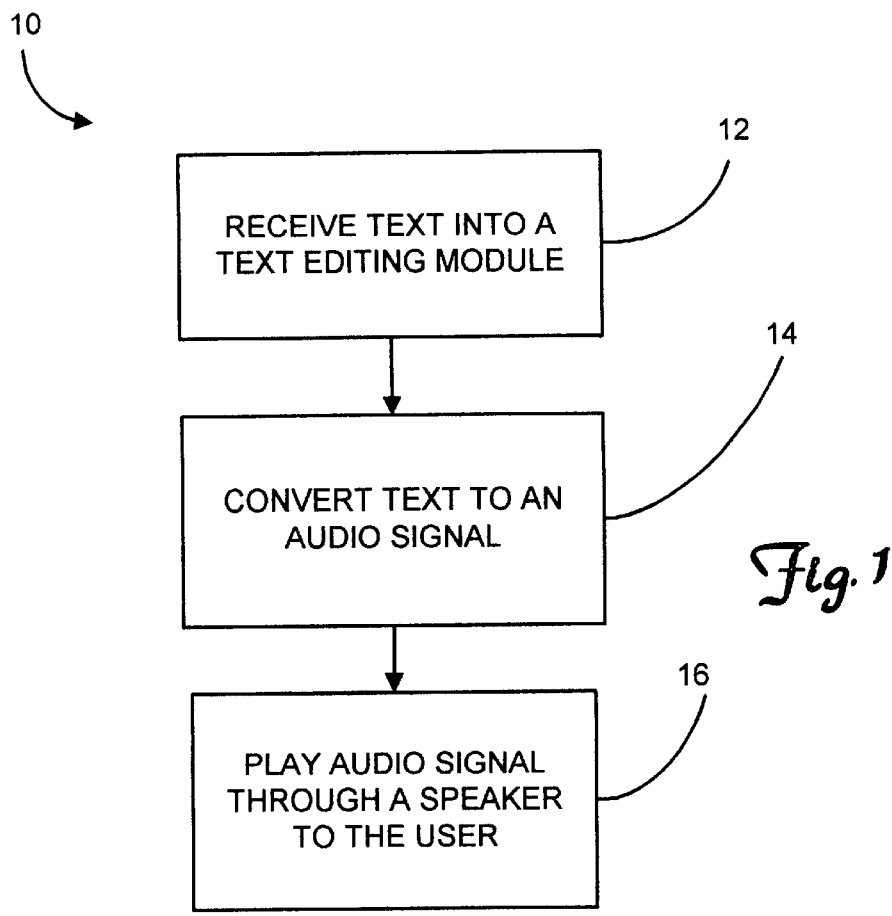
FIG. 1 is a flow chart illustrating an aspect of the present invention.

Referring to FIG. 1, one aspect of the present invention is a method 10 of proofreading text in a computer system. The method 10 includes the steps of receiving input text from a user into a text editing module as indicated at step 12. The text is then converted to an audio signal using a text-to-speech converter at step 14. The audio signal is then played through a suitable speaker to the user at step 16. As will be described below, the text editing module can take many forms. For instance, the text editing module can be a word processing application. In addition, the text editing module can form part of a dictation system that receives input speech from the user through a microphone and converts the input speech to text. In a further embodiment, the text editing module can be a system as described in the background section above that receives phonetic (or stroke) symbols from the user and converts the symbols to a written language such as Japanese, Chinese, Hindi or Korean. As used herein, a text editing module is a device that receives and processes text information based on input commands from the user through an input device, such as a keyboard or mouse, allowing the user to select, move, copy or delete characters, words or phrases as desired.

Figure 2:
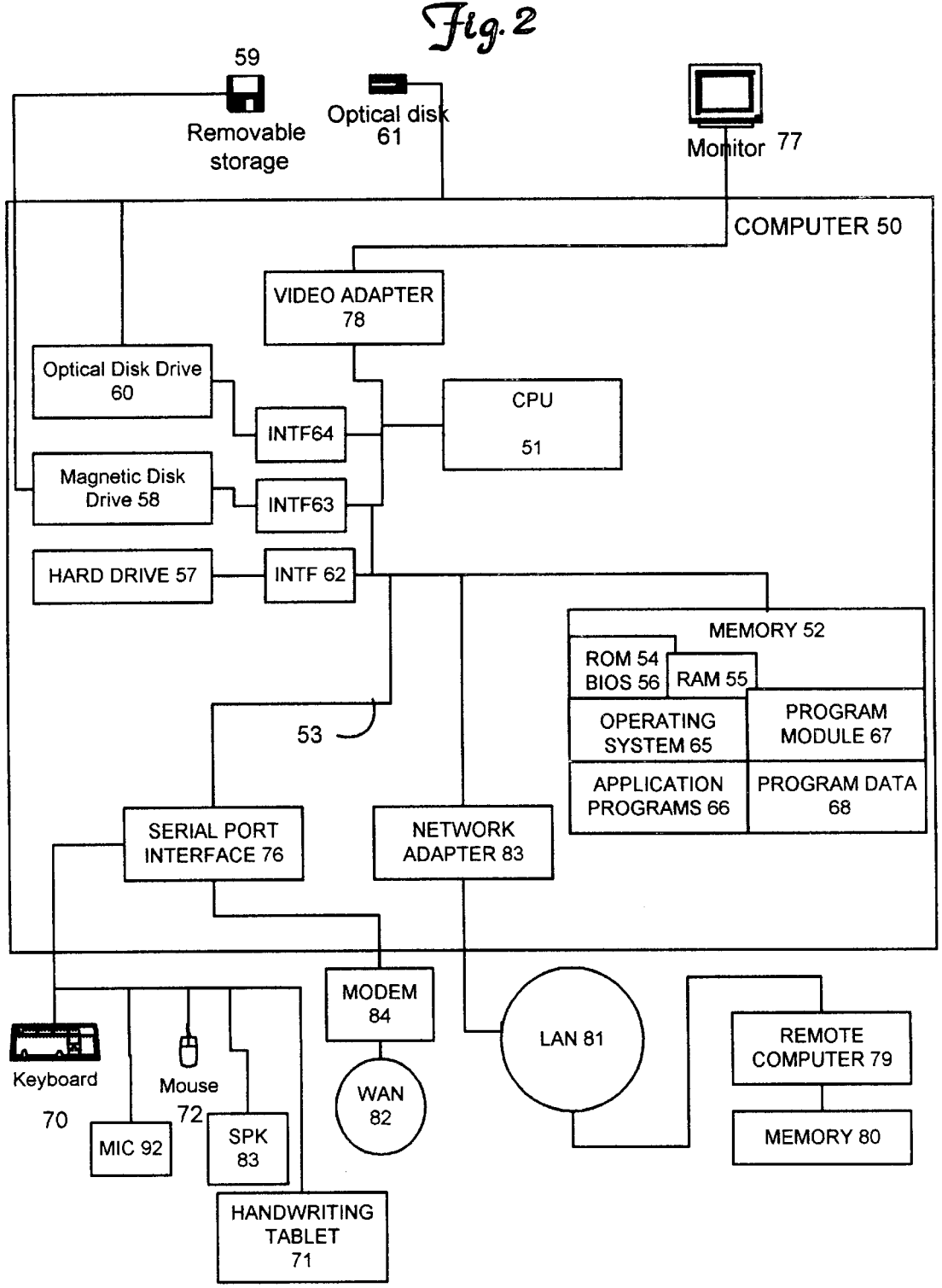
FIG. 2 is a block diagram of an exemplary environment for implementing the present invention.

Prior to a detailed discussion of the present invention, an overview of an operating environment may be helpful. FIG. 2 and the related discussion provide a brief, general description of a suitable computing environment in which the invention can be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. In a distributed computing environment, program modules can be located in both local and remote memory storage devices.

With reference to FIG. 2, an exemplary system for implementing the invention includes a general purpose computing device in the form of a conventional personal computer 50, including a processing unit 51, a system memory 52, and a system bus 53 that couples various system components including the system memory to the processing unit 51. The system bus 53 can be any of several types of bus structures including a memory bus or memory controller, a peripheral bus, and a local bus using any of a variety of bus architectures. The system memory includes read only memory (ROM) 54 and a random access memory (RAM) 55. A basic input/output system 56 (BIOS), containing the basic routine that helps to transfer information between elements within the personal computer 50, such as during start-up, is stored in ROM 54. The personal computer 50 further includes a hard disk drive 57 for reading from and writing to a hard disk (not shown), a magnetic disk drive 58 for reading from or writing to a removable magnetic disk 59, and an optical disk drive 60 for reading from or writing to a removable optical disk such as a CD ROM or other optical media. The hard disk drive 57, magnetic disk drive 58, and optical disk drive 60 are connected to the system bus 53 by a hard disk drive interface 62, magnetic disk drive interface 63, and an optical drive interface 64, respectively. The drives and the associated computer-readable media provide nonvolatile storage of computer readable instructions, data structures, program modules and other data for the personal computer 50.

Although the exemplary environment described herein employs the hard disk, the removable magnetic disk 59 and the removable optical disk 61, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, can also be used in the exemplary operating environment.

A number of program modules can be stored on the hard disk, magnetic disk 59, optical disk 61, ROM 54 or RAM 55, including an operating system 65, one or more application programs 66, other program modules 67, and program data 68. A user can enter commands and information into the personal computer 50 through input devices such as a keyboard 70, a handwriting tablet 71, a pointing device 72 and a microphone 92. Other input devices (not shown) can include a joystick, game pad, satellite dish, scanner, or the like. These and other input devices are often connected to the processing unit 51 through a serial port interface 76 that is coupled to the system bus 53, but can be connected by other interfaces, such as a sound card, a parallel port, a game port or a universal serial bus (USB). A monitor 77 or other type of display device is also connected to the system bus 53 via an interface, such as a video adapter 78. In addition to the monitor 77, personal computers typically include other peripheral output devices such as a speaker 83 and a printer (not shown).

The personal computer 50 can operate in a networked environment using logic connections to one or more remote computers, such as a remote computer 79. The remote computer 79 can be another personal computer, a server, a router, a network PC, a peer device or other network node, and typically includes many or all of the elements described above relative to the personal computer 50, although only a memory storage device 80 has been illustrated in FIG. 1. The logic connections depicted in FIG. 1 include a local area network (LAN) 81 and a wide area network (WAN) 82. Such networking environments are commonplace in offices, enterprise-wide computer network Intranets and the Internet.

When used in a LAN networking environment, the personal computer 50 is connected to the local area network 81 through a network interface or adapter 83. When used in a WAN networking environment, the personal computer 50 typically includes a modem 84 or other means for establishing communications over the wide area network 82, such as the Internet. The modem 84, which can be internal or external, is connected to the system bus 53 via the serial port interface 76. In a network environment, program modules depicted relative to the personal computer 50, or portions thereof, can be stored in the remote memory storage devices. As appreciated by those skilled in the art, the network connections shown are exemplary and other means of establishing a communications link between the computers can be used.

Figure 3:
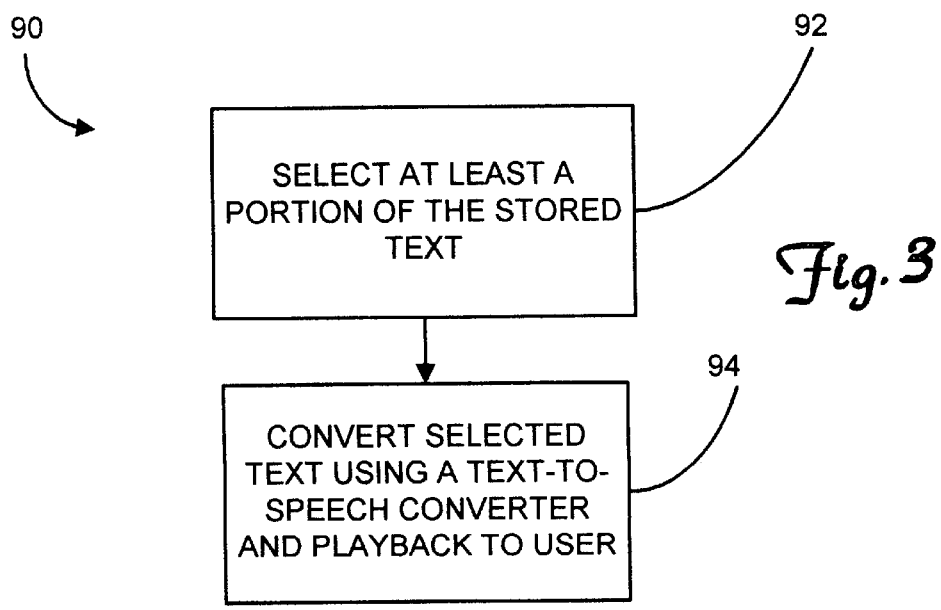
FIG. 3 is a flow chart illustrating a method of operation for a word processing application according to the present invention.

In a first exemplary embodiment, the text editing module is a word processing application operated on the computer 50. The word processing application is indicated in FIG. 2 at 66 and is used to edit text stored in any of the memory devices described above. Referring to FIG. 3, a first method of operating the word processing application 66 is indicated at 90. Generally, the method 90 includes step 92 where the user selects at least a portion of the text that will be converted to speech. At step 94, the selected speech is provided as an input to a text-to-speech converter 121 (FIG. 5) discussed below.

Figure 4:
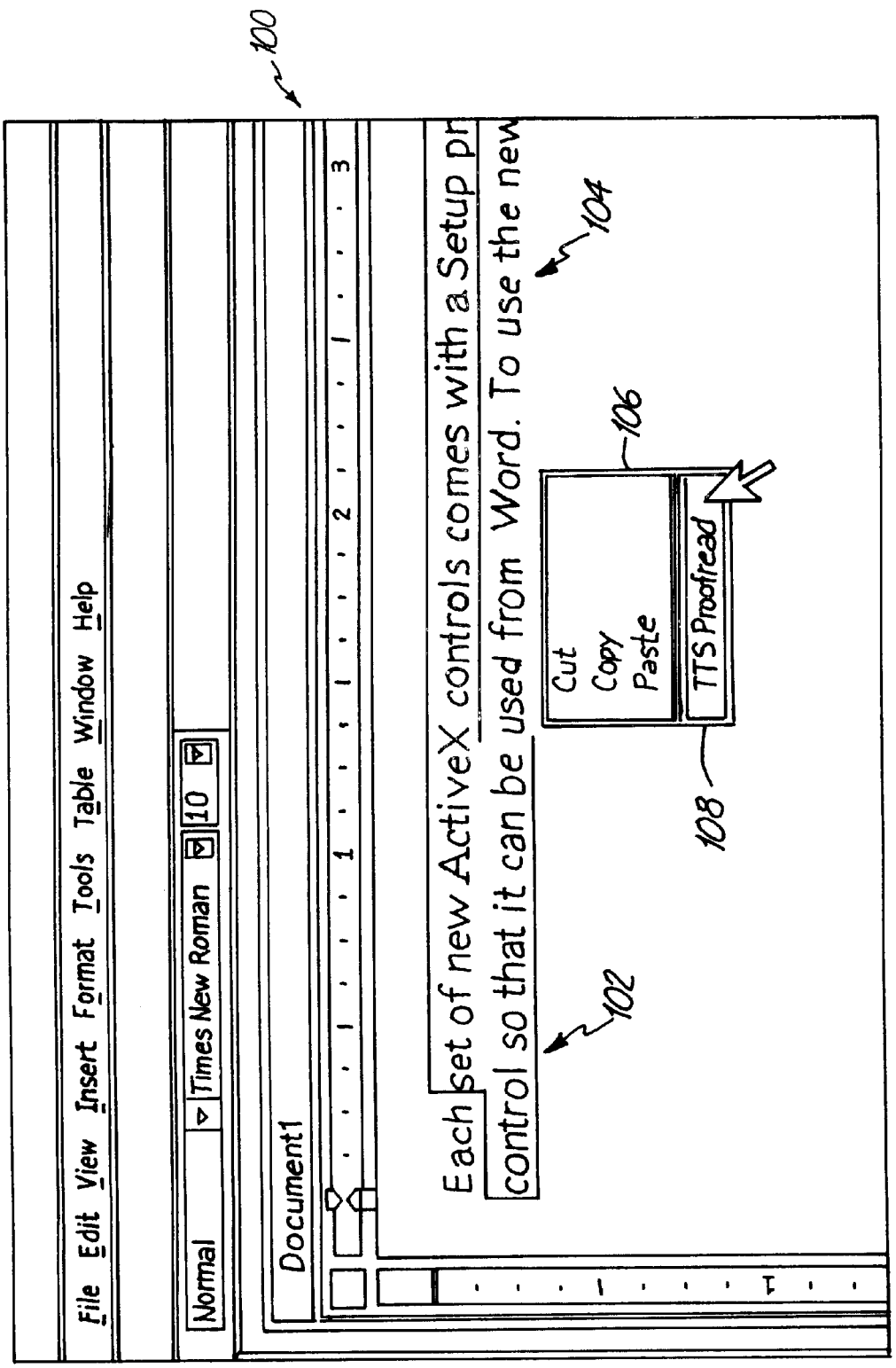
FIG. 4 is a screen display illustrating the method of FIG. 3.

FIG. 4 is a screen display 100 illustrating the method 90 of FIG. 3. The screen display 100 is viewable on the monitor 77 when the word processing application 66 is operable. Using one of the input devices for the computer 50, such as the mouse 72, the user selects at least a portion 102 of text 104 that will be converted to speech. The user can then interact with a dialog box 106 that includes an option 108 that initiates conversion of the selected text 102 to speech. Although illustrated wherein the selected text 102 comprises a portion of the text 104, which is then converted to speech, it should be understood that in a further embodiment the user can easily direct the word processing application 66 to select all of the text 104 (i.e. the complete document) to be converted to speech.

In a further embodiment of the method 90 of FIG. 3, the selected text 102 that is converted to speech at step 94 can be played to the user in a semi-continuous manner. For instance, as the user provides text to the word processing application 66, for example, through the keyboard 70 or the handwriting tablet 71 (FIG. 2), the word processing application 66 can automatically convert the text to speech. The portion of the text that is converted to speech can be based upon a selected number of words that have been entered, the occurrence of selected punctuation marks (for instance, when a ".", ":" or ";" has been entered), or based upon operation of a non-alphanumeric key on the keyboard 70 such as the "enter" key or the "control" key. In any of the operating modes described above, conversion of selected text to speech for playback to the user provides a form of feedback previously unavailable from such word processing applications. Audio playing of the selected text 102 allows the user to look away from the monitor 77 during proofreading. In this manner, the user can relax during proofreading and/or perform other tasks.

Figure 5:
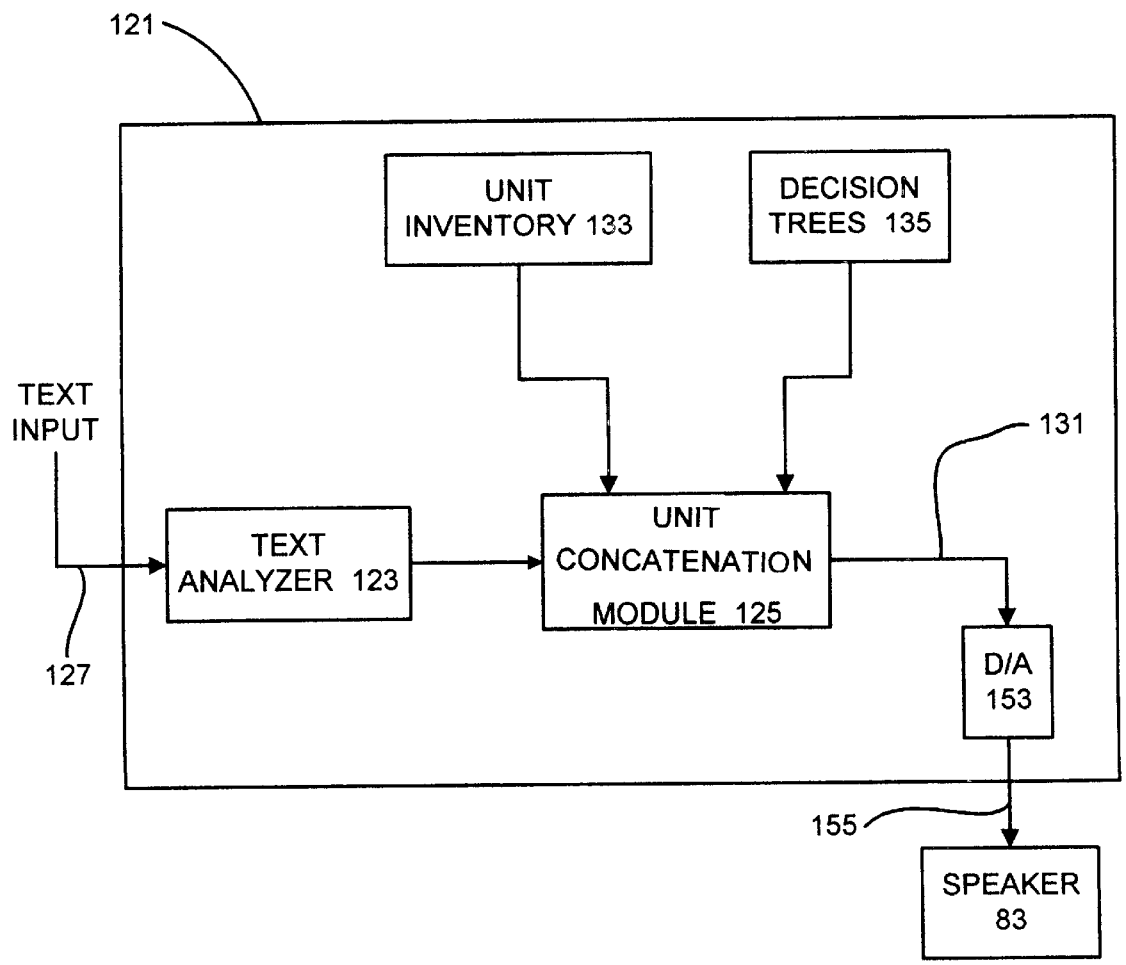
FIG. 5 is a block diagram of a text-to-speech converter.

An exemplary text-to-speech converter 121 for converting text to speech is illustrated in FIG. 5. Generally, the converter 121 includes a text analyzer 123 and a unit concatenation module 125. Text to be converted into synthetic speech is provided as an input 127 to the text analyzer 123. The text analyzer 123 performs text normalization, which can include expanding abbreviations to their formal forms as well as expanding numbers, monetary amounts, punctuation and other non-alphabetic characters into their full word equivalents. The text analyzer 123 then converts the normalized text input to a string of sub-word elements, such as phonemes, by known techniques. The string of phonemes is then provided to the unit concatenation module 125. If desired, the text analyzer 123 can assign accentual parameters to the string of phonemes using prosodic templates, not shown.

The unit concatenation module 125 receives the phoneme string and constructs synthetic speech input, which is provided as an output signal 131 to a digital-to-analog converter 153, which in turn, provides an analog signal 155 to the speaker 83. Based on the string input from the text analyzer 123, the unit concatenation module 125 selects representative instances from a unit inventory 133 after working through corresponding decision trees stored at 135. The unit inventory 133 is a store of representative decision tree based context-dependent phoneme-based units of actual acoustic data. In one embodiment, triphones (a phoneme with its one immediately preceding and succeeding phonemes as the context) are used for the context-dependent phoneme-based units. Other forms of phoneme-based units include quinphones and diphones. The decision trees 135 are accessed to determine which phoneme-based unit is to be used by the unit concatenation module 125. In one embodiment, the phoneme-based unit is one phoneme so a total of 45 phoneme decision trees are created and stored at 135.

The phoneme decision tree 135 is a binary tree that is grown by splitting a root node and each of a succession of nodes with a linguistic question associated with each node, each question asking about the category of the left (preceding) or right (following) phoneme. The linguistic questions about a phoneme's left or right context are usually generated by an expert in linguistics in a design to capture linguistic classes of contextual affects. In one embodiment, Hidden Markov Models (HMM) are created for each unique context-dependent phoneme-based unit. A detailed description of creating the unit inventory 133 and the decision trees 135 is provided in co-pending application entitled "APPARATUS AND METHOD FOR CONVERTING TEXT-TO-SPEECH USING DECISION TREE CLUSTERED CONTEXT DEPENDENT PHONEME-BASED UNITS", Ser. No. 08/949,138, filed Oct. 2, 1997, which is hereby incorporated by reference.

As stated above, the unit concatenation module 125 selects the representative instance from the unit inventory 133 after working through the decision trees 135. During run time, the unit concatenation module 125 can either concatenate the best preselected phoneme-based unit or dynamically select the best phoneme-based unit available from a plurality of instances that minimizes a joint distortion function. In one embodiment, the joint distortion function is a combination of HMM score, phoneme-based unit concatenation distortion and prosody mismatch distortion. The system 121 can be embodied in the computer 50 wherein the text analyzer 123 and the unit concatenation module 125 are hardware or software modules, and where the unit inventory 133 and the decision trees 135 can be stored using any of the storage devices described with respect to computer 50.

As appreciated by those skilled in the art, other forms of text-to-speech converters can used. Besides the concatenative synthesizer 121 described above, articulator synthesizers and format synthesizers can also be used to provide audio proofreading feedback.

Figure 6:
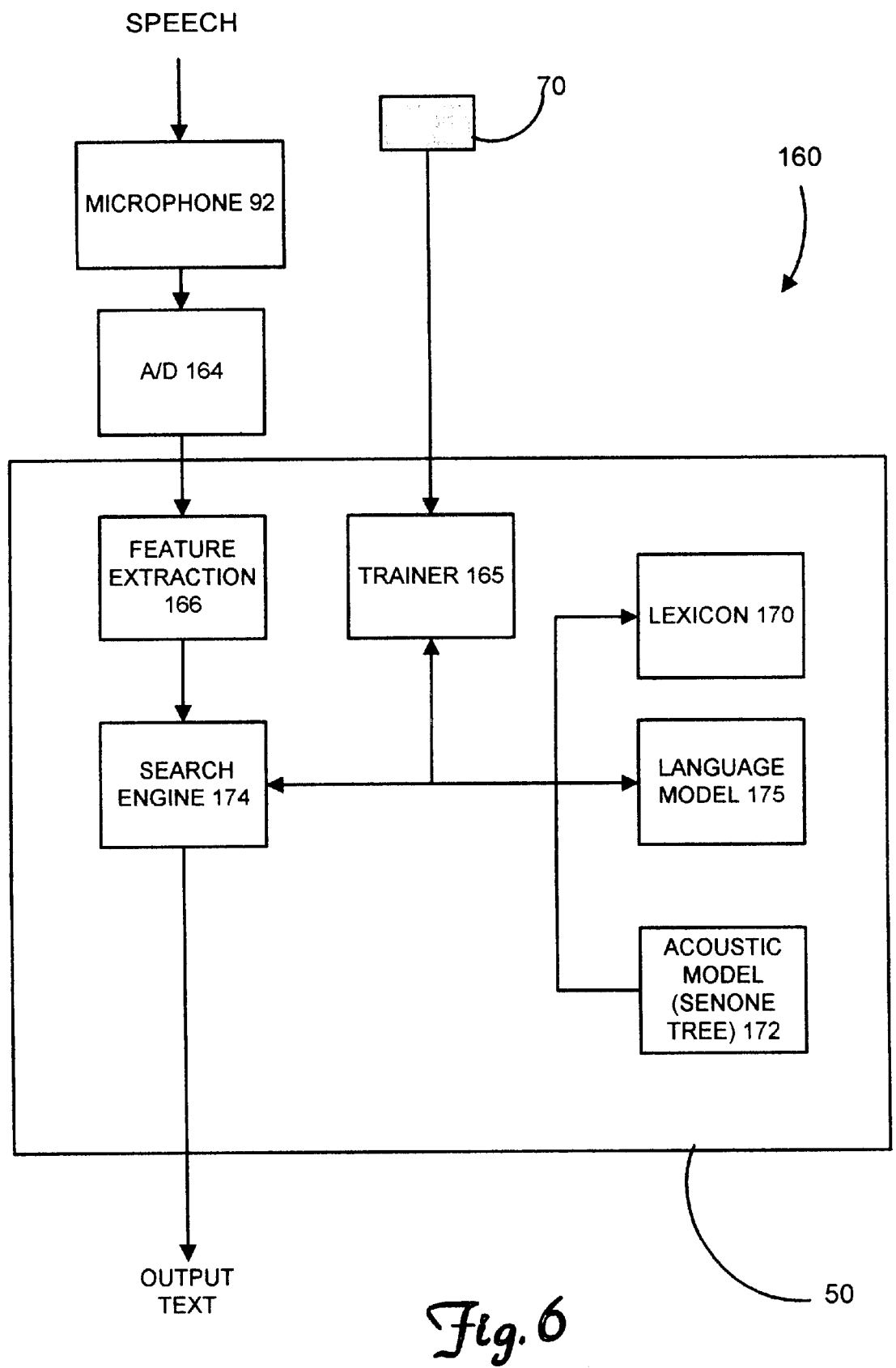
FIG. 6 is a block diagram of a speech recognition system.

In a further embodiment, the word processing application 66 can include a speech recognition module or speech recognition system 160 illustrated in FIG. 6. The speech recognition system 160 receives input speech from the user and converts the input speech to the text 104. Commonly, a speech recognition system used in this manner is referred to as a "dictation system".

In operation, the speech recognition system 160 can convert the input speech of the user to the text 102, at which point, the user can then select a portion or all of the text 104 using the mouse 72 and convert it back to speech using the method described above with respect to FIG. 3. However, in another mode of operation, the text 104 can be converted to speech in an automatic manner. For instance, the text 104 can be converted to speech when, during dictation, the user pauses for a selected time period. In yet another embodiment, the text can be converted to speech when an audible indicator, such as a selected utterance, has been detected, or an input device such as the keyboard 70 or the mouse 72 has been operated. By using both the speech recognition system 160 and the text-to-speech converter 121 in combination, a system and method have been presented that provide feedback to the user as to what exactly has been perceived by the computer 50 during dictation. It is important to note that this system does not merely play back the audio signal received through the microphone 92, but rather, synthesizes what words have been detected by the speech recognition system 160. Moreover, the system can use the same prosodic pattern to synthesize the recognized sentence to provide a realistic resemblance to the original input speech. It is believed that the natural prosodic sentence will enable users to detect recognition errors more efficiently. Although the speech recognition system 160 can form a part of a word processing application or a text editing module, it should be understood that the present invention also includes a dictation system that provides only a text file as an output. In other words, one form of a dictation system may not include capabilities for editing the text file.

An exemplary embodiment of the speech recognition system 160 is illustrated in FIG. 6. The speech recognition system 160 includes the microphone 92, an analog-to-digital (A/D) converter 164, a training module 165, feature extraction module 166, a lexicon storage module 170, an acoustic model along with senone trees 172, a tree search engine 174, and a language model 175. It should be noted that the entire system 160, or part of speech recognition system 160, can be implemented in the environment illustrated in FIG. 2. For example, microphone 92 can preferably be provided as an input device to the computer 50, through an appropriate interface, and through the A/D converter 164. The training module 165 and feature extraction module 166 can be either hardware modules in the computer 50, or software modules stored in any of the information storage devices disclosed in FIG. 2 and accessible by the processing unit 51 or another suitable processor. In addition, the lexicon storage module 170, the acoustic model 172, and the language model 175 are also preferably stored in any of the memory devices shown in FIG. 2. Furthermore, the tree search engine 174 is implemented in processing unit 51 (which can include one or more processors) or can be performed by a dedicated speech recognition processor employed by the personal computer 50.

In the embodiment illustrated, during speech recognition, speech is provided as an input into the system 160 in the form of an audible voice signal by the user to the microphone 92. The microphone 92 converts the audible speech signal into an analog electronic signal which is provided to the A/D converter 164. The A/D converter 164 converts the analog speech signal into a sequence of digital signals, which is provided to the feature extraction module 166. In one embodiment, the feature extraction module 166 is a conventional array processor that performs spectral analysis on the digital signals and computes a magnitude value for each frequency band of a frequency spectrum. The signals are, in one illustrative embodiment, provided to the feature extraction module 166 by the A/D converter 164 at a sample rate of approximately 16 kHz.

The feature extraction module 166 divides the digital signal received from the A/D converter 164 into frames that include a plurality of digital samples. Each frame is approximately 10 milliseconds in duration. The frames are then encoded by the feature extraction module 166 into a feature vector reflecting the spectral characteristics for a plurality of frequency bands. In the case of discrete and semi-continuous Hidden Markov Modeling, the feature extraction module 166 also encodes the feature vectors into one or more code words using vector quantization techniques and a codebook derived from training data. Thus, the feature extraction module 166 provides, at its output the feature vectors (or code words) for each spoken utterance. The feature extraction module 166 provides the feature vectors (or code words) at a rate of one feature vector or (code word) approximately every 10 milliseconds.

Output probability distributions are then computed against Hidden Markov Models using the feature vector (or code words) of the particular frame being analyzed. These probability distributions are later used in executing a Viterbi or similar type of processing technique.

Upon receiving the code words from the feature extraction module 166, the tree search engine 174 accesses information stored in the acoustic model 172. The model 172 stores acoustic models, such as Hidden Markov Models, which represent speech units to be detected by the speech recognition system 160. In one embodiment, the acoustic model 172 includes a senone tree associated with each Markov state in a Hidden Markov Model. The Hidden Markov models represent, in one illustrative embodiment, phonemes. Based upon the senones in the acoustic model 172, the tree search engine 174 determines the most likely phonemes represented by the feature vectors (or code words) received from the feature extraction module 166, and hence representative of the utterance received from the user of the system.

The tree search engine 174 also accesses the lexicon stored in module 170. The information received by the tree search engine 174 based on its accessing of the acoustic model 172 is used in searching the lexicon storage module 170 to determine a word that most likely represents the codewords or feature vector received from the features extraction module 166. Also, the search engine 174 accesses the language model 175, which is illustratively a 60,000 word trigram language model derived from the North American Business News Corpus and set out in greater detail in a publication entitled CSR-III Text Language Model, University of Penn., 1994. The language model 175 is also used in identifying the most likely word represented by the input speech. The most likely word is provided as output text.

Although described herein where the speech recognition system 160 uses HMM modeling and senone trees, it should be understood that the speech recognition system 160 can take many forms and all that is required is that it provide as an output the text spoken by the user.

Figure 7:
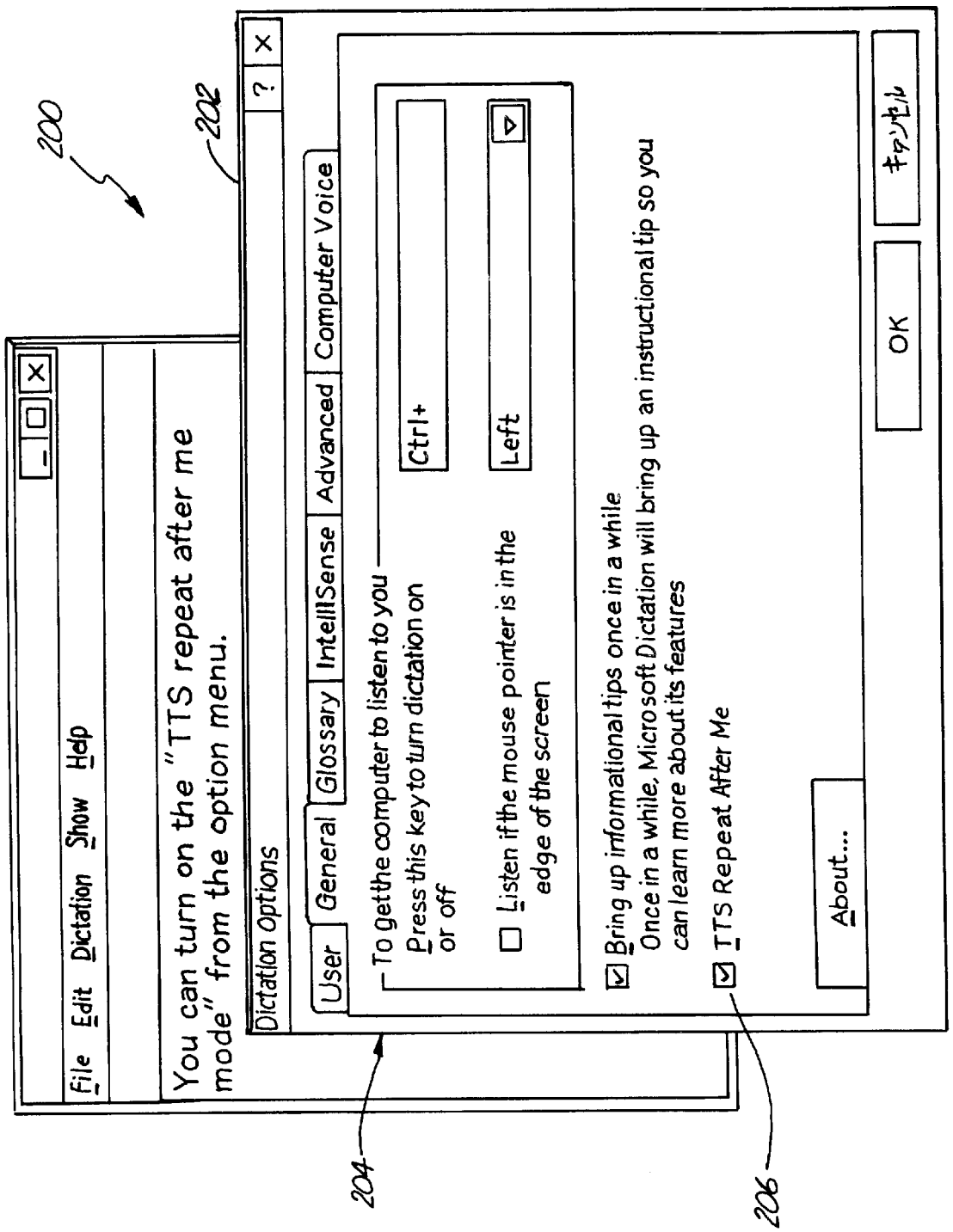
FIG. 7 is a screen display of a dictation system.

FIG. 7 illustrates exemplary user interfaces 200 used in a dictation system. A user interface 202 can be displayed by the user to change various options in the dictation system. For example, a portion 204 of the user interface 202 allows the user to select which key of the keyboard 70 or action of the mouse 92 that will turn the dictation system on or off. At location 206 in the user interface 202, the user can select whether or not text inputted by the user will be converted back to speech for feedback automatically after the user pauses for a pre-determined time period.

Figure 10:
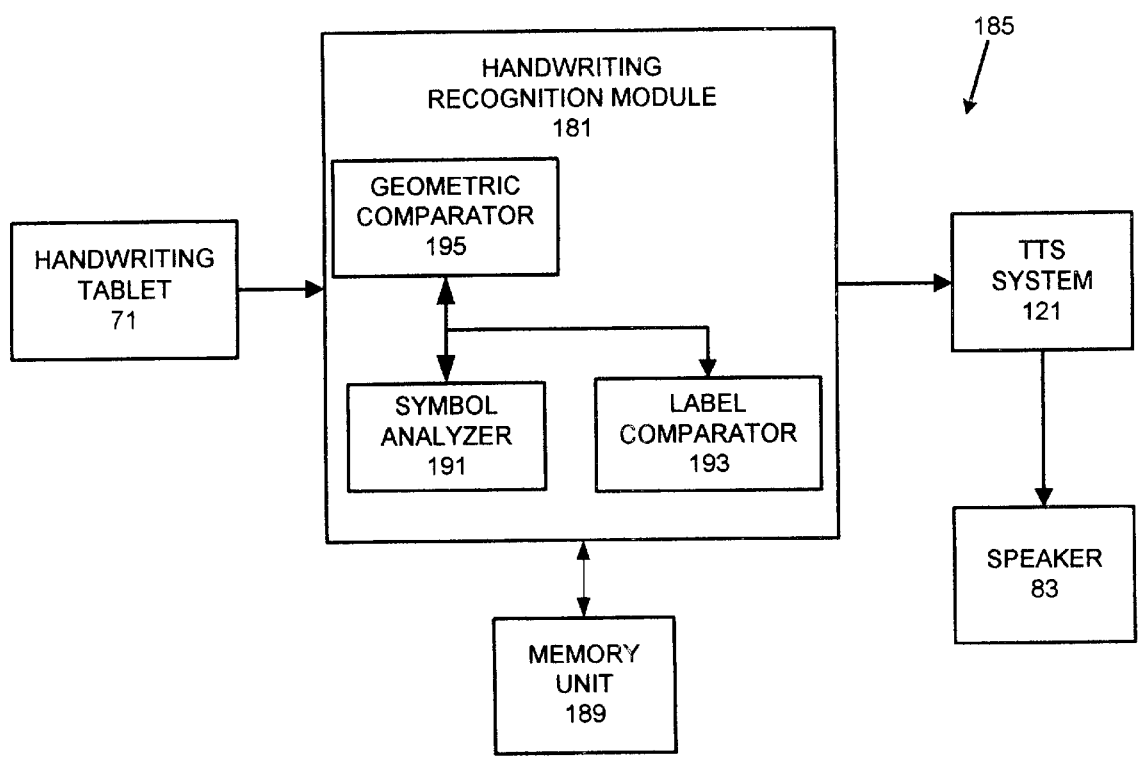
FIG. 10 is a block diagram of a handwriting recognition system.

In a further embodiment, the word processing application 66 can include a handwriting recognition module 181 illustrated in FIG. 10. The handwriting recognition module 181 receives input from the user through the handwriting tablet 71 and converts the input to the text 104. The text 104 is then provided to the text-to-speech converter system 121, described above, for playback to the user. In one exemplary mode of operation, the text 104 can be converted to speech in an automatic manner. For instance, the text 104 can be converted to speech when the user pauses for a selected time period. In yet another embodiment, the text 104 can be converted to speech when the user operates a preselected key on the keyboard 70, operates some other input device, or writes in a selected region of the handwriting tablet 71. By using both the handwriting recognition module 181 and the text-to-speech 121 in combination, a system and method have been presented that provide audio feedback to the user. Commonly, in prior art systems, the user must look at another portion of the display to determine what the computer has determined the input handwriting text to be. In the present system, the user can listen while input text is being provided. In this manner, the user need not divert attention away from the handwriting tablet 71 and can concentrate on entering text through the handwriting tablet 71.

Handwriting recognition systems are generally well known. One exemplary embodiment is illustrated in FIG. 10 and is disclosed in U.S. Pat. No. 5,729,629, which is assigned to the same assignee as the present invention, and which is hereby incorporated by reference. Briefly, the handwriting recognition system 185 includes the handwriting recognition module 181 coupled to the handwriting tablet 71 that receives handwritten input symbols from a user and displays reference symbols determined by the handwriting recognition module 181 to correspond to the handwritten symbols. The handwriting recognition module 181 is coupled to a memory unit 189 that temporarily stores coordinate information representing features of the input symbols as received from the handwriting tablet 71. The handwriting recognition module 181 includes a symbol analyzer 191 that retrieves the coordinate information from the memory unit 189 and translates the coordinate information for each written feature into a feature code representing one of a predetermined number of feature models stored in the memory unit 189. The symbol analyzer 191 also creates a geometric representation of the input symbol for comparison with one or more geometric models stored in the memory unit 189.

The handwriting recognition module 181 advantageously evaluates both individual features of the handwritten symbol and the symbol as a whole. The individual feature evaluation is accomplished by a label comparator 193 that compares the feature codes for the input symbol with feature codes of reference symbols stored in the memory unit 189 and identifies the reference symbol or symbols having feature codes that most closely match the feature codes of the input symbol. The whole symbol evaluation is performed by a geometric comparator 195 that compares stored geometric models corresponding to the reference symbols having the most closely matching features with the geometric representation of the input symbol. The geometric comparator 195 uses its comparison to identify the reference symbols whose geometric model or models most closely match the geometric representation of the input symbol. The reference symbol that most closely matches the handwritten input symbol, as determined by the label comparator 193 and geometric comparator 195, is sent to a suitable display device such as the monitor 77, which displays the reference symbol to the user.

The handwriting recognition system 185 can be implemented on the computer 50, discussed above. The memory unit 189 can include any of the memory devices discussed above, such as the RAM 55, the hard disk drive 57, the removable magnetic disk 59 or a CD for the optical disk drive 60. The symbol analyzer 191, label comparator 193, and the geometric comparator 195 can be handwired circuits, but preferably are software programs. The handwriting tablet 71 includes an input device, such as a conventional digitizer tablet and pen or an electronic scanner. Generally, the input device provides a series of X-Y coordinate points to define segments of strokes that correspond to continuous motion of the pen on the digitizing table or of the pattern of the symbol as detected by the electronic scanner. The handwriting tablet 71 sends the coordinate points to the memory unit 189 where they are stored while the symbols are being recognized. When the present invention is used in connection with a palm-top computer or a personal digital assistant (PDA), the handwriting tablet 71 and the computer 50 are part of a single unit and the handwriting tablet can be overlaid on the display device.

Figure 8:
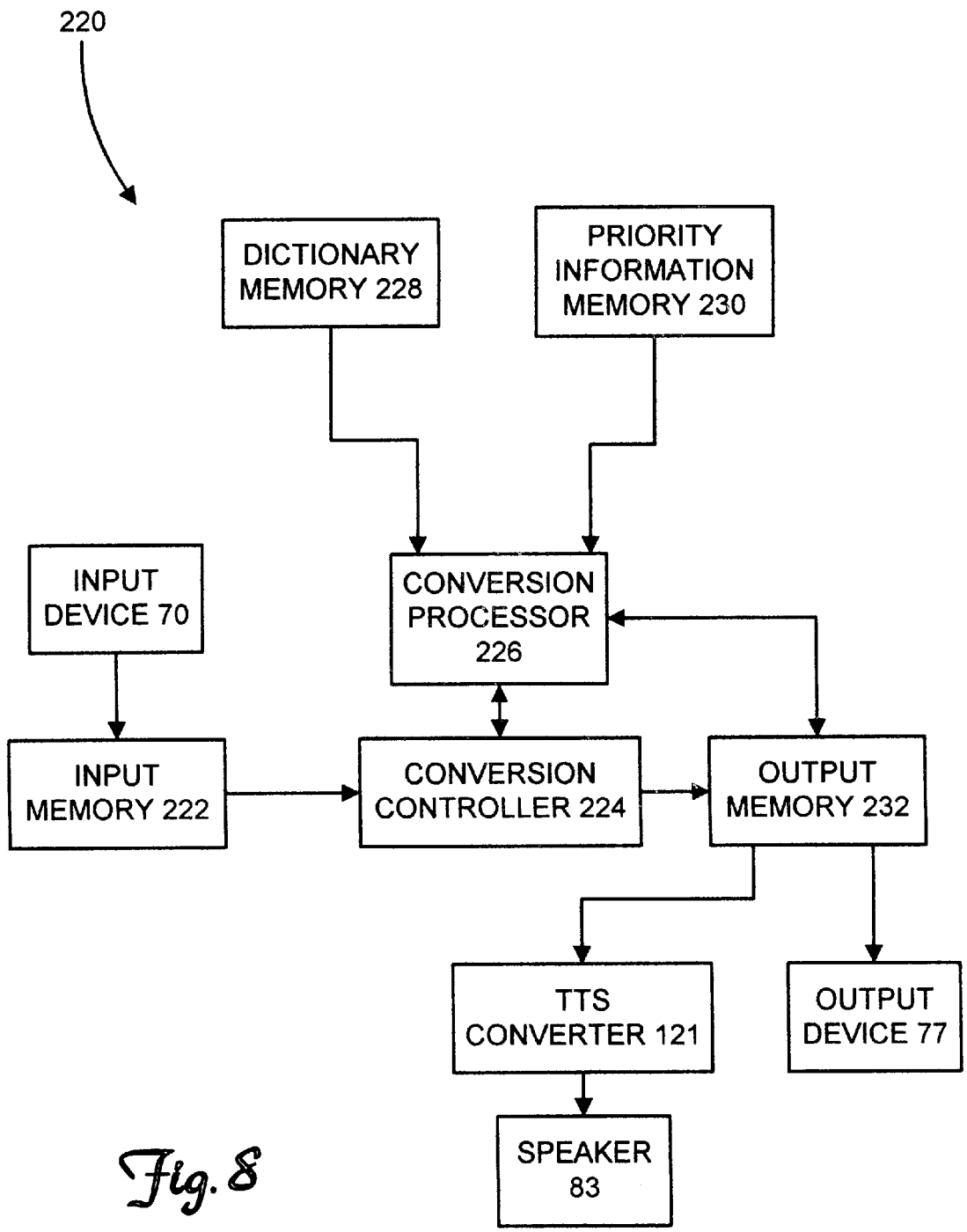
FIG. 8 is a block diagram of a language conversion system.

FIG. 8 is a block diagram illustrating an exemplary processing system or text editing system 220 used in a Japanese text editor or word processing apparatus according to an embodiment of the present invention. System 220 includes the keyboard 70 for entering phonetic data. In this embodiment, phonetic data is provided in alphabetical form wherein the phonetic data comprises Romaji phonetic symbols. However, a Kana keyboard can also be used. Alternatively, the keyboard 70 can be replaced or used with the speech recognition system 160 described above to enter phonetic data.

Phonetic data provided by the keyboard 70 is stored in input memory 222 and transferred from input memory 222 to a conversion controller 224. If entered using Romaji phonetic symbols, the symbols are first processed using a conversion processor 226 to convert the Romaji phonetic symbols to Kana characters. The conversion processor 226 accesses dictionary data stored in memory 228 converting the Romaji phonetic symbols to Kana characters.

The Kana data is then segmented into predetermined processing units, for example, into units of words or clauses under the control of conversion processor 226. The segmented data is then subjected to Kana-Kanji conversion processing. The conversion processor 226 uses dictionary data also stored in the memory 228 for Kana-Kanji conversion. If a plurality of Kanji forms correspond to one sequence of Kana characters, the conversion processor 226 can select the most likely one as a conversion result determined by the language models (usually implemented by a N-gram language model, like the word trigram language model 175 in the exemplary embodiment of the speech recognition system illustrated in FIG. 6) stored in memory 230.

Sequentially converted strings including both Kanji and Kana characters are stored in an output memory buffer 232. The entire written form consisting of Kanji and Kana characters are then provided to the text-to-speech converter 121, which converts the Kanji and Kana character string to speech for playback through the speaker 83 to the user. If, during playback, the user audibly detects an error in the string, the user can initiate display of the alternative Kana and Kanji characters on the monitor 77.

Figure 9:
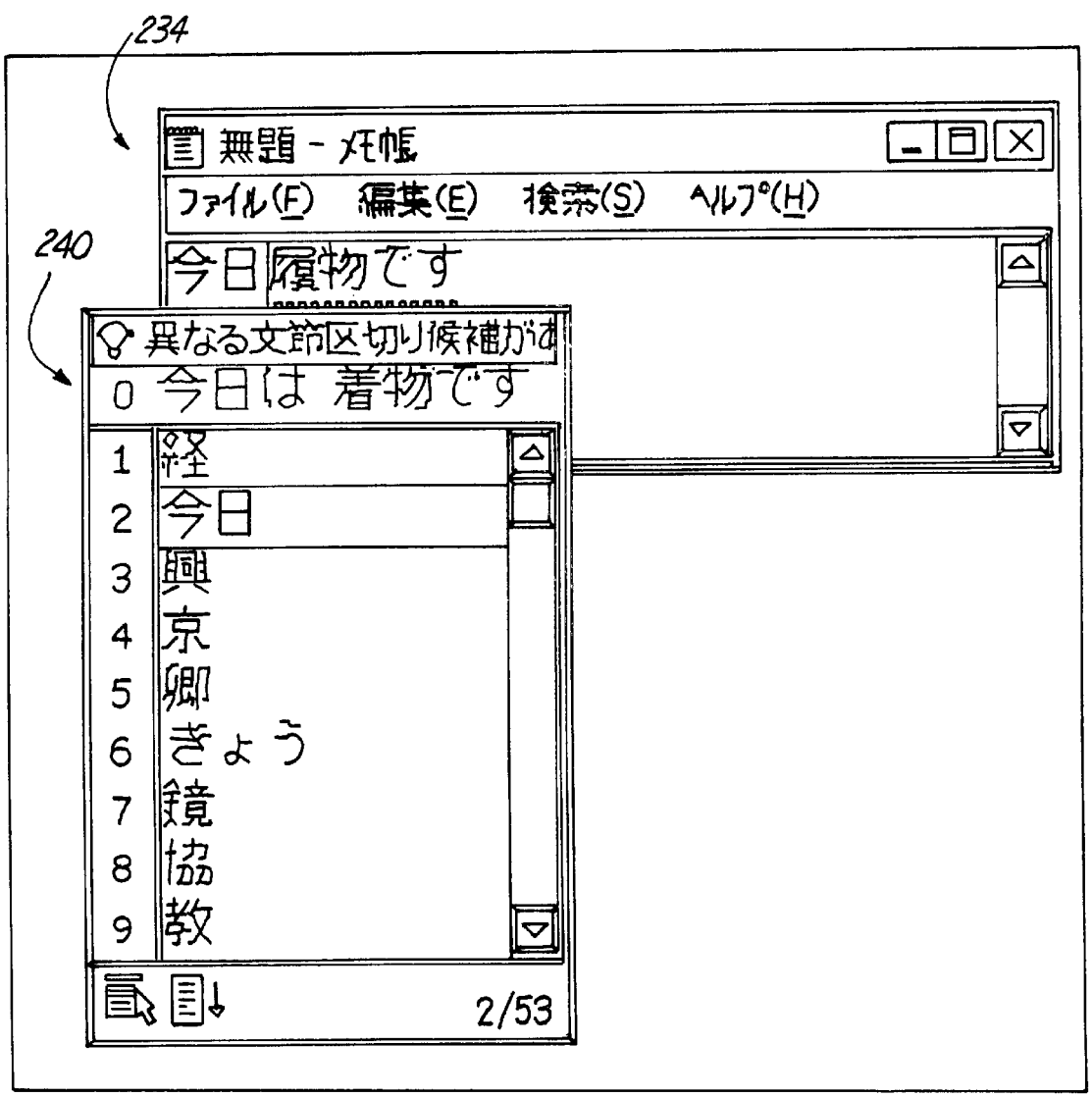
FIG. 9 is a screen display of the language conversion system.

FIG. 9 illustrates an exemplary user interface 234 for displaying the resulting Kanji character string. Typically, the user is also provided with a user interface 240, which allows the user to select other homonyms for the highlighted Kanji characters. In this example, the sentence "今日阪物です" and "今日は着物です" have the same Kana input string—"きょうはきものです" and Romaji string—"kyouhakimonodesu", but have distinct pronunciations which should be easily detectable by listening to the sentences generated by TTS converter 121. Both exemplary user interfaces 234 and 240 shown here are part of Microsoft Japanese IME97 system.

Using the system 220, the user can use audio feedback to verify that the correct Kanji characters have been selected rather than visual feedback as currently used in known prior art systems. In this manner, the user need not constantly switch attention from the document to be inputted and the monitor 77 in order to verify that correct conversion has taken place. Instead, the user can concentrate on a document to be inputted, diverting attention when necessary to the monitor 77 when the user audibly detects that an error has taken place during conversion, or the user has incorrectly entered phonetic data.

Conversion of Kana and Kanji string to speech for proofreading feedback can be performed automatically when a predetermined quantity of kanas (or Romajis) have been entered by the user. Alternatively, conversion can take place when a selected key, such as a "space" key (for example, in Microsoft IME97 system, a "space" key will trigger the Kana->kanji conversion which is very natural, and which can also be used to initiate audio feedback playback), has been operated by the user or selected punctuation marks, such as periods ("MaRu" in Japanese have been entered. Although described above with respect to the Kana IME system in the Japanese language, it should be understood that this aspect of the present invention is well suited for other languages such as Chinese, Hindi, Korean or any other language where homonyms are present and conversion errors can take place. Particularly in the case of Chinese, there is almost no effective means of detecting typing or conversion errors because neither explicit word boundaries nor semantic separators (like Kana) are presented. The audio feedback provides effective and efficient means to detect typing or conversion errors for the two most popular Chinese input methods: Pinyin and Wu-Bi IME's. Since Pinyin IME is not composed of tones and Wu-Bi is a stroke-based IME, typing or conversion errors will almost definitely generate different perceived sound and therefore become highly noticeable. However, this aspect of the present invention is also well suited for any language, such as English, described above, where the system can be useful in detecting input errors entered by the user.

Although the present invention has been described with reference to preferred embodiments, workers skilled in the art will recognize that changes may be made in form and detail without departing from the spirit and scope of the invention.

What is claimed is:

1. A computer implemented method of proofreading text in a computer system, the method comprising:
    receiving text comprising multiple words from a user and an indicator into a text editing module and detecting the indicator, the indicator being embodied in the text and defining a boundary in the text received;
    converting the text to an audio signal; and
    playing the audio signal through a speaker to the user when the indicator is detected while receiving further text.

2. The method of claim 1 wherein the step of receiving includes receiving input speech from the user with a microphone, and the method further comprises converting the input speech to said text.

3. The method of claim 1 wherein the indicator comprises a selected number of words.

4. The method of claim 1 wherein the indicator comprises a selected punctuation mark.

5. The method of claim 1 wherein the indicator comprises a selected audio utterance.

6. The method of claim 1 wherein the indicator is provided as a function of operation of an input device, and wherein the step of detecting comprises detecting operation of the input device.

7. The method of claim 6 wherein the input device comprises a keyboard.

8. The method of claim 6 wherein the input device comprises a handwriting device.

9. The method of claim 1 wherein the step of receiving text includes receiving phonetic symbols related to the text, and the method further comprises converting the phonetic symbols to the text.

10. The method of claim 9 wherein the phonetic symbols represent a language from the group consisting of Japanese, Chinese, Hindi and Korean.

11. The method of claim 1 wherein the step of receiving text includes Wu-Bi symbols.

12. A proofreading system operable on a computer for processing text, the computer having an input device and a speaker, the proofreading system comprising:
    a text editing module receiving an input signal from the input device indicative of selected text comprising multiple words bounded by indicators, the indicators being embodied in the text and defining boundaries in the selected text; and
    a text to speech module receiving the selected text and converting the selected text to an output signal providable to the speaker when at least one of said indicators is detected while receiving further text.

13. The proofreading system of claim 12 wherein the text editing module comprises a word processor.

14. The proofreading system of claim 12 wherein the input device comprises a microphone and the text editing module comprises a dictation system.

15. The proofreading system of claim 14 wherein at least one indicator is a selected number of words.

16. The proofreading system of claim 15 wherein at least one indicator is a selected punctuation mark.

17. The proofreading system of claim 12 wherein the indicators are a function of a selected audio utterance.

18. The proofreading system of claim 12 wherein the input device comprises a handwriting device and the text editing module comprises a handwriting recognition module.

19. A dictation system operable on a computer, the computer having a microphone and a speaker, the dictation system comprising:
- a speech recognition module receiving an input signal from the microphone indicative of text bounded by indicators and converting the input signal to text comprising multiple words, wherein the indicators are embodied in the text and define boundaries in the text; and
- a text-to-speech module receiving the text and indicators and converting the text to an output signal providable to the speaker when at least one of said indicators is detected and while the speech recognition module receives further input signals.

20. The dictation system of claim 19 wherein the indicators are a function of audio indicators provided by the user.

21. The dictation system of claim 20 wherein at least one indicator is a selected number of words.

22. The dictation system of claim 20 wherein the indicators are a function of a selected audio utterance.

23. The dictation system of claim 20 wherein at least one indicator is a selected punctuation mark.

24. A proofreading system operable on a computer for processing text, the computer having an input device and a speaker, the proofreading system comprising:
- a dictionary of symbols and corresponding text;
- a text converter coupled to the dictionary and adapted to receive symbols from the input device and to convert the symbols to multiple word text using the dictionary; and
- a text to speech module receiving the multiple word text and converting the multiple word text to an output signal providable to the speaker when an indicator is detected, wherein the indicator is embodied in the text and defines a boundary in the multiple word text, while the text converter receives further symbols.

25. The proofreading system of claim 24 wherein the symbols comprise phonetic symbols represent a language from the group consisting of Japanese, Chinese, Hindi and Korean.

26. The proofreading system of claim 24 wherein the symbols comprise Wu-Bi symbols.

27. A handwriting recognition system operable on a computer, the computer having a handwriting device and a speaker, the handwriting recognition system comprising:
- a handwriting recognition module receiving an input signal from the handwriting device and converting the input signal to text comprising multiple words; and
- a text-to-speech module receiving the text and converting the text to an output providable to the speaker when an indicator is detected, wherein the indicator is embodied in the text and defines a boundary in the text, while the handwriting recognition system receives further input signals.

28. A computer implemented method of proofreading text in a computer system, the method comprising:
- receiving text comprising multiple words from a user into a text editing module wherein the text is bounded by indicators comprising delays in receipt of further text;
- converting the text to an audio signal; and
- playing the audio signal through a speaker to the user when the indicator is detected.

29. The method of claim 28 wherein the step of receiving includes receiving input speech from the user with a microphone, and the method comprises converting the input speech to the text.

30. The method of claim 28 wherein the delay is provided as a function of operation of an input device.

31. The method of claim 30 wherein the input device comprises a keyboard.

32. The method of claim 30 wherein the input device comprises a handwriting device.

33. The method of claim 30 wherein the step of receiving text includes receiving phonetic symbols related to the text, and a method further comprises converting the phonetic symbols to the text.

34. The method of claim 33 wherein the phonetic symbols represent language from the group consisting of Japanese, Chinese, Hindi and Korean.

35. The method of claim 28 wherein the step of receiving text includes receiving Wu-Bi symbols, and a method further comprises converting the Wu-Bi symbols to the text.

36. A proofreading system operable on a computer for processing text, the computer having an input device and a speaker, the proofreading system comprising;
- a text editing module receiving an input signal from the input device indicative of selected text, wherein the selected text is bounded by indicators comprising delays in receiving text; and
- a text to speech module receiving the selected text and converting the selected text to an output signal providable to the speaker when detecting one of said indicators.

37. The proofreading system of claim 36 wherein the input device comprises a handwriting recognition device.

38. The proofreading system of claim 36 wherein the input device comprises a keyboard.

39. The proofreading system of claim 36 wherein the input device comprises a microphone.

* * * * *